United States Patent
Hollerbach

[11] Patent Number: 6,150,781
[45] Date of Patent: Nov. 21, 2000

[54] METHOD FOR CONTROLLING AN OPERATING CONFIGURATION FOR MOVING PARTS OF MOTOR VEHICLES

[75] Inventor: Bernhard Hollerbach, Steingaden, Germany

[73] Assignee: Hoerbiger Hydraulik GmbH, Schongau, Germany

[21] Appl. No.: 09/252,820

[22] Filed: Feb. 19, 1999

[30] Foreign Application Priority Data

Feb. 19, 1998 [AT] Austria ........................................ 301/98

[51] Int. Cl.[7] ........................................................ H02P 5/00
[52] U.S. Cl. ........................... 318/283; 318/286; 318/282; 318/466; 296/110; 296/117; 296/107
[58] Field of Search ........................... 318/139, 226–293, 318/434–466; 296/707, 117, 107, 116, 112, 110, 121

[56] References Cited

U.S. PATENT DOCUMENTS

| | | | |
|---|---|---|---|
| 4,529,920 | 7/1985 | Yoshida et al. | 318/466 |
| 4,673,848 | 6/1987 | Hagiwara et al. | 318/266 |
| 4,749,193 | 6/1988 | Hacker | 318/626 |
| 4,775,823 | 10/1988 | Yoshida et al. | 318/266 |
| 4,881,018 | 11/1989 | Kato et al. | 318/9 |
| 4,999,551 | 3/1991 | Yoshida et al. | 318/286 |
| 5,067,768 | 11/1991 | Fischbach | 296/107 |
| 5,315,220 | 5/1994 | Takimoto et al. | 318/282 |
| 5,350,986 | 9/1994 | Long et al. | 318/432 |
| 5,396,158 | 3/1995 | Long et al. | 318/282 |
| 5,404,673 | 4/1995 | Takeda et al. | 49/28 |
| 5,451,849 | 9/1995 | Porter et al. | 318/466 |
| 5,563,483 | 10/1996 | Kowall et al. | 318/283 |
| 5,625,175 | 4/1997 | Gutknecht et al. | 187/316 |
| 5,772,274 | 6/1998 | Tokarz | 296/707 |
| 5,825,147 | 10/1998 | Porter et al. | 318/466 |
| 5,982,126 | 11/1999 | Hellinga et al. | |

*Primary Examiner*—Paul Ip
*Attorney, Agent, or Firm*—Dykema Gossett PLLC

[57] ABSTRACT

A method of controlling an operating configuration for moving parts on motor vehicles, especially for trunk lids, convertible tops or similar devices, in which configuration the part to be moved is hinge connected to the motor vehicle by at least one connecting element and is provided with a controllable driving means, where the speed of the moving part (8) is monitored, and the driving means (17, 18) is turned off independently of any end position signals when the speed of these parts drops to a very low level or to zero; the motion of the automatically moving part on the motor vehicle can be stopped automatically or an emergency shut-down function is provided for the opening and closing movement when an obstacle is encountered. For this purpose, the speed of the moving part (8) is monitored indirectly by determining the speed of at least one connecting element (2, 3; 10–12, 16) or driving means (17, 18) which is connected to this part (8).

12 Claims, 2 Drawing Sheets

METHOD FOR CONTROLLING AN OPERATING CONFIGURATION FOR MOVING PARTS OF MOTOR VEHICLES

The invention concerns a method for controlling an operating configuration for moving parts of motor vehicles, especially for trunk lids, folding convertible tops and the like, in which configuration the part to move is connected by hinge to the motor vehicle by at least one connecting element and is provided with a controllable driving agent, whereby the speed of the moving part is monitored and the driving means is switched off independently of any end position signals, when the speed of one of these parts is very small or equal to zero, and an operating configuration for moving parts of motor vehicles, especially for trunk lids, convertible tops, or similar devices, with a hinge connection of the part to be moved to the motor vehicle, to a driving means, to sensors, and to a control unit connected to the driving means and the sensors; the control unit is connected to at least one sensor from whose signals a value for the speed is determined and the driving means is switched off as soon as at least one sensor emits signals representing a very low speed or a speed equal to zero of the moving parts on the motor vehicle.

Tailgates or trunk lids are increasingly being opened and closed automatically, which is preferably accomplished by electric or hydraulic drives. Information must be obtained about the respective position of the trunk lid or some other moving part on the motor vehicle, such as the engine hood, automatic doors, etc., in order to start the opening or closing movement, to terminate this movement, to switch valves during the movement or to control pressures or the like. This information is delivered to the control unit by means of end position switches or sensors for intermediate positions and similar devices.

However, the conventional control devices have the disadvantage that it is impossible to manually stop the movement of the trunk lid or other moving part on the motor vehicle with the existing systems, because the drive continues to run until the preset end position has been reached. This is also a safety risk, because in this case the movement of the moving part is not stopped if, for example, someone becomes pinched or the moving part strikes any obstacle. In addition to endangering people's health, this unbraked movement can also lead to significant damage to the motor vehicle. Unexamined German Patent No. 19,649,698 describes a control device for a power cut-off, especially for use in motor vehicles. The discussion in that patent regarding the detection of obstacles does not make any mention of the parts actually monitored, and the only detailed discussion concerns the problems of measuring the speed of the part, specifically on the moving part itself. Instead, on the basis of problems with the methods known so far, other options are proposed here based on a comparison of the setpoint force and the actual force at each point in the path of the opening and closing motion. However, this force will differs according to the spatial orientation of the motor vehicle, and it is extremely complicated and therefore expensive to take all possible positions into account.

Therefore, the object of the present invention is to provide a method and an operating configuration which will avoid the aforementioned disadvantages and will permit a simple method of manually stopping the movement of an automatically activated moving part on a motor vehicle or permit an emergency shut-down function for the opening and closing movement when the part strikes an obstacle.

SUMMARY OF THE INVENTION

This object is achieved by a method of the type mentioned in the preamble, which is characterized in that the speed of the moving part is monitored indirectly by determining the speed of at least one connecting element or driving means connected to this part. This implements a safety and comfort function which detects contact between the moving part of the motor vehicle—whether a trunk lid, an engine hood, a door, or a window—with an obstacle on the basis of the rapid drop in speed to the point of stoppage and shuts off the drive in this event. This prevents serious damage to the motor vehicle or serious injury to the user. This safety function is provided in all possible positions of the moving part, because the speed is monitored over the entire path or the entire opening or closing angle of the vehicle part. Moreover, it is possible to manually stop the movement of the motor vehicle part, which has been moving automatically until then, in any desired position by simply stopping and blocking it.

For tailgates, engine hoods other motor vehicle parts which can move about a swivel axis or by means of a hinge arrangement, it is advantageous if the rotational speed of at least one connecting element or driving means is monitored. This rotational speed is causally related to the movement of the moving part and thus permits the most direct and immediate means of deriving control signals.

In the case of linearly moving motor vehicle parts, such as sliding doors or automatic windows, as well as swiveling automotive parts which are activated by essentially linearly acting driving means, it is possible according to another feature of this invention to provide for the essentially linear movement of at least one connecting element or driving means to be monitored. Since linear movement generally has a large working path, a better resolution and a more precise reaction to changes in speed are possible.

Especially with moving vehicle parts which are movably mounted on the motor vehicle by arrangements having multiple individual parts, e.g., tailgates that are hinge connected by four-point hinges or similar means, a greater freedom in selecting the position of the sensor is possible if the relative motion of two interconnected parts of a connecting element, of a driving means or of these elements is monitored.

According to another advantageous feature of this invention, the linear path traveled or the rotational angle is determined, and a speed value is determined in the control unit by differentiating with respect to time. This is a variant of the method according to this invention which can be implemented with simple and functionally reliable parts and can also be executed quickly and with simple computations in the control unit, so that rapid reaction times and thus a rapid response of the automatic cut-off device is possible together with a high degree of safety.

The operating configuration described in the preamble for achieving the stated object is characterized in that the sensor or each sensor for determining the speed value is provided at the connection point and/or on the driving means. The sensors can supply a speed value directly or they can relay information to the control unit about the path traveled by the moving part or its angle of rotation. In the latter case, a differentiation is performed with respect to time, preferably by means of software or by hard-wired circuits in the control unit in order to calculate the speed of the moving part, e.g., a tailgate or an automatic door. Likewise, the ranges of the speed changes or optionally absolute speed values can be preset by the software or by hard-wired circuits for use by the control unit as a reference value for automatic cut-off of the driving means. In any case, when there is a rapid reduction in speed or when a preset speed is exceeded, the control unit shuts off the driving means, preferably on detecting that the moving motor vehicle part has stopped.

A simple and functionally reliable design is obtained when a linear path sensor is connected preferably to the driving means, especially to a hydraulic working cylinder.

On the other hand, a very compact design is obtained when, according to another feature of this invention, a rotational angle sensor is mounted on or directly in an articulated means at the connection point, especially a hinge or its link to the driving means.

It is very advantageous for the sensor to be implemented as a proximity switch, preferably as a Hall sensor with measuring mark magnets or magnetic regions as measuring marks, so there is no mechanical influence on the motion of the moving motor vehicle part—for example, no blocking need be feared in the event of failure of the sensor.

An arrangement that is easily adjustable and readily accessible for maintenance is obtained when the sensor casing is mounted on a lever of the hinge connection of the moving part and a belt drive runs from the hinge connection of the lever to the rotating disk of the sensor.

In the following description, this invention is discussed in greater detail with reference to the accompanying drawings.

DETAILED DESCRIPTION OF THE PREFERRED EMBODIMENT

Figure 1:
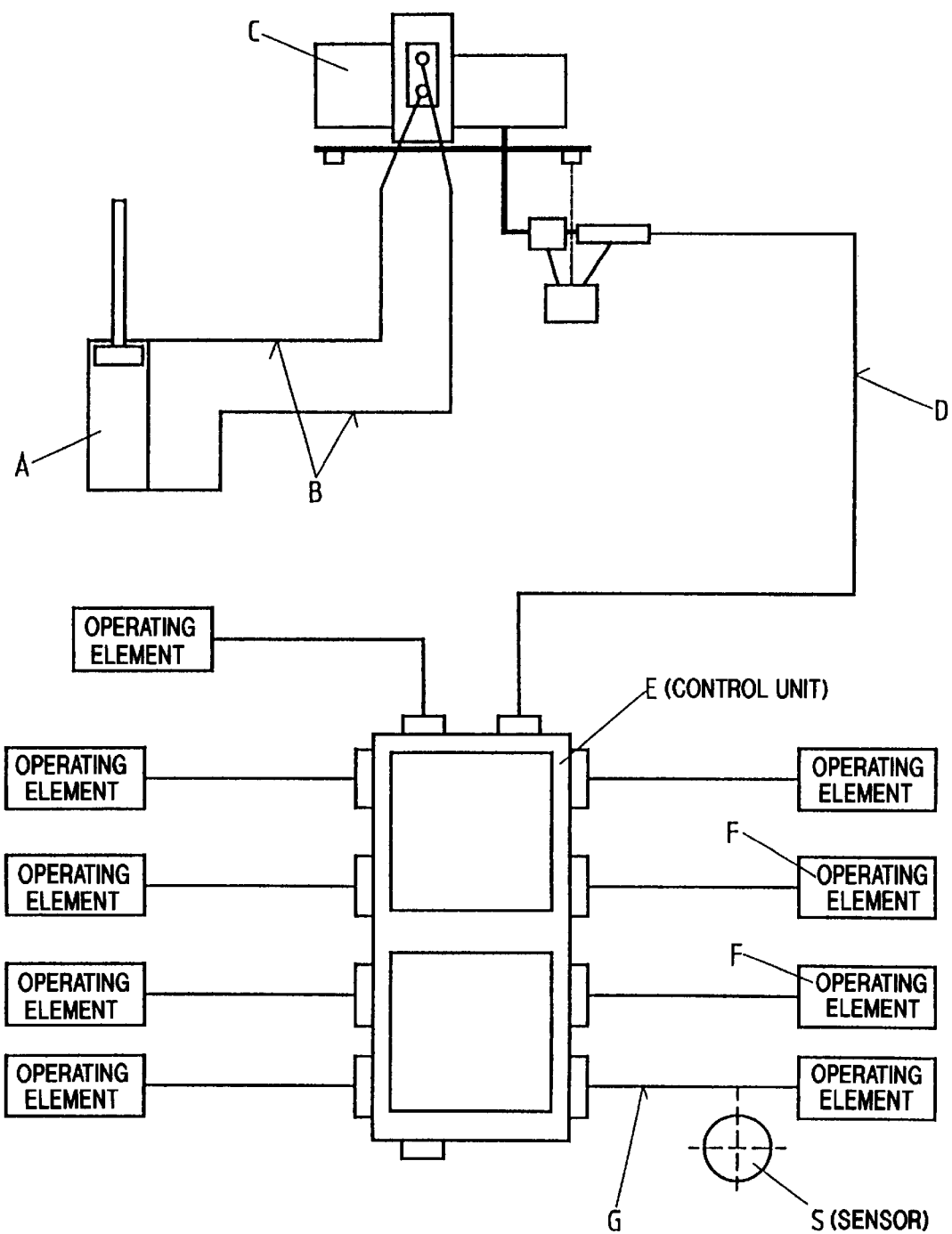
FIG. 1 shows a diagram of an operating configuration for carrying out the method according to this invention.

FIG. 1 illustrates a schematic diagram of an operating configuration, preferably for a folding top of a convertible, where at least one working cylinder A acting on at least one part of the folding convertible top, but preferably a double-acting working cylinder is supplied with hydraulic fluid, preferably hydraulic oil, through hydraulic lines B. The tank for the hydraulic fluid, the pump and its motor are preferably accommodated together in unit C, which is connected to control unit E by a control line D. This control unit E in turn queries at least one operating element F, which is actuated by the user according to the desired action, e.g., a toggle switch or the like, or it queries two operating elements F, one of which is intended for closing the convertible top and the other for opening the convertible top. However, a signal line G leads to control unit E from a sensor S which detects the speed of the folding convertible top, of a part connected to it, preferably a part of the hinge connection on the motor vehicle, or the operating means, i.e., hydraulic cylinder A, as discussed in greater detail below.

Figure 2:
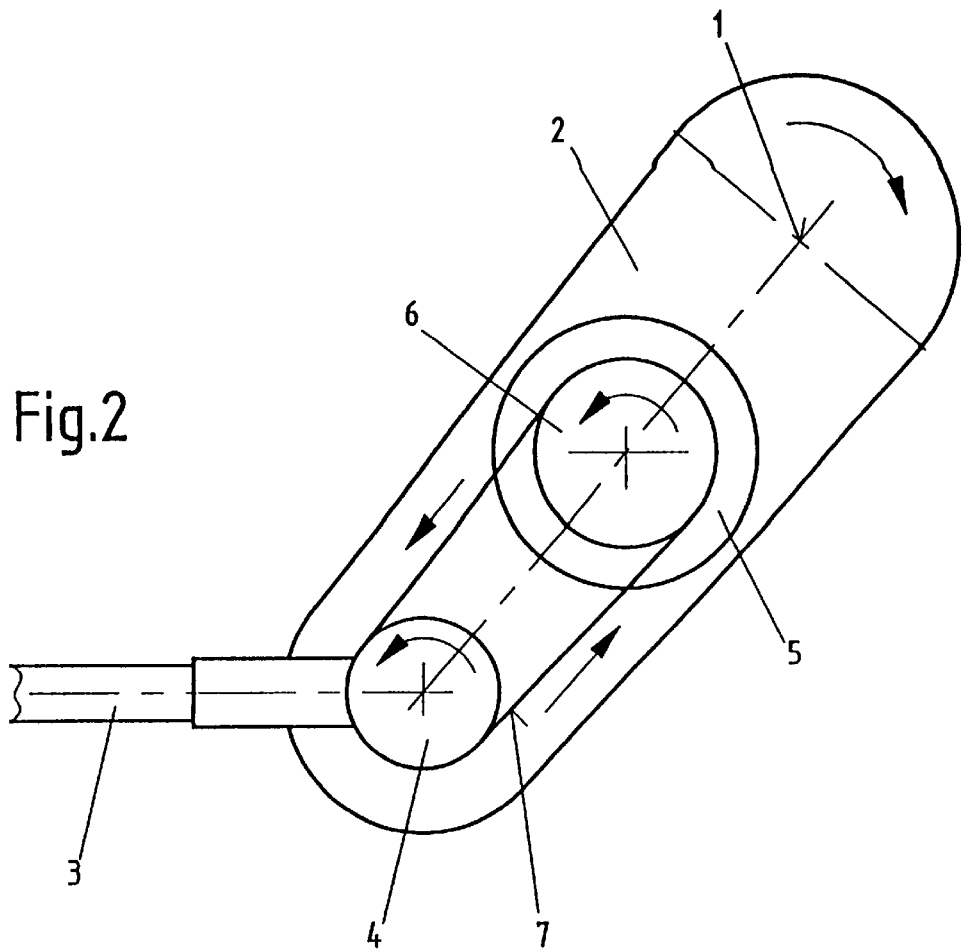
FIG. 2 shows a first embodiment for mounting a sensor for speed monitoring of moving parts mounted on the motor vehicle.

FIG. 2 shows a specific embodiment for mounting and positioning sensor S, where a first lever 2 can be pivoted around an axis of rotation 1 on the motor vehicle by means of a drive (not shown). At the end of the lever 2 which is opposite the axis of rotation 1, another operating rod is hinge connected, moving the part of the motor vehicle which is to be moved directly or indirectly by means of intermediate elements, especially a tailgate or a convertible top. A first pulley 4 is nonrotationally mounted on the head of the operating rod 3, which is in turn connected to an articulated joint to lever 2. Housing 5 of a rotational angle sensor S, for example, is rigidly connected to lever 2, and a sensor parts having the measuring marks is connected in a rotationally fixed manner to a second pulley 6 in this housing 5. The two pulleys 4 and 6 are linked together with regard to their movement by belt 7, so that swiveling of lever 2 about its axis of rotation 1, which also indirectly moves the tailgate or a similar item, is detected by sensor S in housing 5, and the respective position can be relayed to control unit E. Then further processing takes place in this control unit E, especially differentiation with respect to time for derivation of a speed value for the tailgate.

Figure 3:
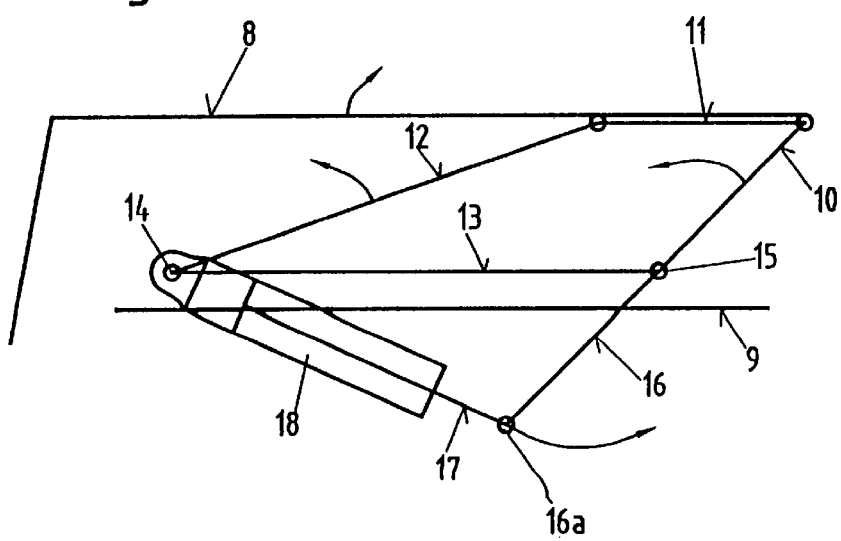
FIG. 3 shows another embodiment of the mounting in the case of a four-point hinge.

Another, slightly more complicated arrangement is diagramed in FIG. 3, where, for example, a trunk lid 8 of a motor vehicle is connected to its body, preferably in the region of its drip molding 9, by a four-point hinge 10–13 as an example of a multipoint hinge. Trunk lid 8 is connected here to hinge top part 11 with its points rotation being at a distance from the motor vehicle. The bottom part of the hinge 13 and the points of rotation closer to motor vehicle 14, 15 may be placed, for example, on a side of the drip molding 9. The swiveling motion for opening and closing trunk lid 8 is accomplished by the different lengths of the two hinge levers 10 and 12 in their swiveling motion.

Hinge lever 10 is lengthened inward beyond point of rotation 15 with an inside lever 16, on which the piston rod 17 of a hydraulic cylinder 18 which is used as a driving means acts at connection point 16a. To detect the movement of a trunk lid 8, a linear path sensor S may be mounted on the cylinder-piston rod unit 17, 18, for example, and connected to control unit E. However, in order to create a very compact design, a rotational angle sensor is again provided preferably in the area of rotation point 15 of the four-point hinge 10–13, preferably directly in the articulation of rotation point 15, whose position signals are differentiated with respect to time in control unit E and converted to signals representing the speed of the movement of tailgate 8. If these signals indicate a sharp decrease in speed within a short period of time or a speed essentially equal to zero, the control unit will shut off the drive unit 17, 18.

What is claimed is:

1. A method of controlling an operating configuration for moving parts on motor vehicles, said moving parts including trunk lids, convertible tops and covers for convertible tops, in which configuration the part to be moved is movably connected to the motor vehicle by means of a connecting arrangement comprising at least two interconnected rigid elements, said rigid elements including a rigid lever and a working cylinder, wherein the speed of the moving part is monitored indirectly by detecting relative speed of at least two directly interconnected rigid elements of the connecting arrangement and the working cylinder is turned off as soon as a very low speed or a speed of zero of the moving part of the motor vehicle is indirectly detected.

2. A method according to claim 1, wherein at least one of the rigid elements is pivotably mounted and a rotational speed of one of said pivotably mounted rigid elements is detected.

3. A method according to claim 2, wherein the rotational path of an element of the connection arrangement is detected, and a speed value is determined in the control unit by differentiation with respect to time.

4. A method according to claim 1, wherein an essentially linear movement of at least one of the rigid connecting elements is detected.

5. A method according to claim 1, wherein the path traveled by at least one part of an element of the connection arrangement is detected, and a speed value is determined in the control unit by differentiation with respect to time.

6. An operating configuration for moving parts on motor vehicles, including trunk lids, convertible tops and covers for convertible tops, having an articulated connection of the part to be moved to the motor vehicle, comprising at least one rigid element, at least one working cylinder, sensors and a control unit connected to the working cylinder and the sensors, wherein at least one of the sensors is coupled to at least one rigid element of the articulated connection for determining the speed of said element relative to another part of the articulated connection and is connected to said control unit, turning off the working cylinder as soon as at least one sensor supplies signals representing a very low speed or a speed of zero of the moving part of the motor vehicle.

7. An arrangement according to claim 6, wherein a linear path sensor is connected to the working cylinder.

8. An arrangement according to claim 6, wherein a rotational angle sensor is mounted on or directly in a hinge of the articulated connection.

9. An arrangement according to claim 8, wherein a rotational angle sensor is mounted on or directly in the connection of a hinge arrangement to the driving means.

10. An arrangement according to claim 6, wherein the sensor is a proximity switch.

11. An arrangement according to claim 10, wherein the sensor is a Hall sensor with measuring mark magnets or magnetic areas as measuring marks.

12. An arrangement according to claim 6, wherein the sensor casing is mounted on a lever of the articulation of the moving part, and a belt drive runs from a hinge connection of the lever to a rotary disk of the sensor.

\* \* \* \* \*